United States Patent [19]

Chilton et al.

[11] Patent Number: 5,592,574
[45] Date of Patent: Jan. 7, 1997

[54] METHOD AND APPARATUS FOR EXPANSION OF WHITE SPACE IN DOCUMENT IMAGES ON A DIGITAL SCANNING DEVICE

[75] Inventors: Jeff K. Chilton; John F. Cullen, both of Mt. View, Calif.; Koichi Ejiri, Chiba-ken, Japan

[73] Assignee: Ricoh Company Ltd., Japan

[21] Appl. No.: 371,678

[22] Filed: Jan. 12, 1995

Related U.S. Application Data

[63] Continuation of Ser. No. 28,676, Mar. 9, 1993, abandoned, which is a continuation-in-part of Ser. No. 864,432, Apr. 6, 1992, Pat. No. 5,335,290.

[51] Int. Cl.$^6$ ........................................... G06K 9/32
[52] U.S. Cl. .............................. 382/295; 382/298
[58] Field of Search ............................. 395/146, 147, 395/148, 138, 139; 358/451, 452; 382/293, 295, 298, 276, 173, 176, 180

[56] References Cited

U.S. PATENT DOCUMENTS

| 4,595,958 | 6/1986 | Anderson, Jr. et al. | 358/451 |
| 4,866,784 | 9/1989 | Barski . | |
| 4,941,189 | 7/1990 | Britt . | |
| 4,949,287 | 8/1990 | Yamaguchi et al. | 395/148 |
| 4,951,233 | 8/1990 | Fujiwara et al. | 395/148 |
| 5,070,465 | 12/1991 | Kato et al. | 382/44 |
| 5,120,940 | 6/1992 | Willsie . | |
| 5,185,813 | 2/1993 | Tsujimoto | 382/9 |
| 5,218,460 | 6/1993 | Nakajima | 382/54 |
| 5,333,039 | 7/1994 | Sagara | 355/218 |

OTHER PUBLICATIONS

Wahl et al. "Block Segmentation and Text Extraction in Mixed Text/Image Documents" Comp. Graphics and Image Proc., 20, pp. 375–390, 1982.

*Primary Examiner*—Joseph Mancuso
*Attorney, Agent, or Firm*—Townsend and Townsend and Crew

[57] ABSTRACT

A method and apparatus for expanding whitespace between lines of text in a document image. The method and apparatus preserves the text size and relative spatial orientation within text areas.

17 Claims, 13 Drawing Sheets

1301  1302  1299 been in business since 1954

We specialize in the creation of fancy pastries for special occassions of all kinds. We are best known for the intricately constructed and imaginative multi-layered cakes of head chef Joan Lott.

Joan decided back in 1954 that the standard round, or square tiered cake had overstayed its' welcome and that it was time for more creative baking. Joan has since created cake replicas of famous buildings

Fig 11

METHOD AND APPARATUS FOR EXPANSION OF WHITE SPACE IN DOCUMENT IMAGES ON A DIGITAL SCANNING DEVICE

This is a Continuation of application Ser. No. 08/028,676, filed Mar. 9, 1993, now abandoned which is a continuation-in-part of application Ser. No. 07/864,423 titled "Segmentation of Text, Picture and Lines of a Document Image" filed Apr. 6, 1992.

BACKGROUND OF THE INVENTION

The present invention relates to reproduction of images and in particular to digital scanning and character recognition systems.

Standard reproduction of documents, however, provide a straight reproduction of the image and do not allow for potentially desirable manipulations of the document image. For example, persons reviewing or annotating preprinted text must often squeeze annotations and comments within the limited space between text lines. The comments and annotations thus become difficult to decipher and the quality of communication decreases.

Although enlargement of the document is possible, enlargement often requires use of a different size paper than the document original. Large paper for this purpose may not be available in the required size. Furthermore, copying to a larger size paper may add bulk or cause other inconvenience to the document reader. Enlargement also expands the image data as well as the white space.

SUMMARY OF THE INVENTION

The present invention provides a method and apparatus for physically increasing the white space between text objects of a document image. The present invention not only increases the white space between objects, but preserves text size and relative spatial orientation within text areas.

According to one embodiment of the present invention, rectangles which bound document image data are first identified. These rectangles are then mapped to an imaginary sheet of paper having dimensions $C_1 X$ by $C_2 Y$ where $C_1$ and $C_2$ are constants. The newly mapped rectangles have the same dimensions as before but are now spaced apart by a greater amount.

According to another embodiment of the present invention, newly mapped rectangles are placed on a physical document image page such that a logical reading order is preserved by assigning a numerical order to groups of rectangles organized as blocks of text. When a newly mapped block overlaps a physical page boundary, that block is divided in two at the page boundary and all subsequent blocks renumbered.

According to yet another embodiment of the present invention, blocks are mapped to the physical page by first mapping picture image areas. Next, the text blocks are mapped to the page in numerical sequence beginning at the upper left of the page. Subsequent blocks are mapped below or to the immediate right of the last mapped block as space permits.

Thus, the present invention preserves image data size, paper size and logical reading order while expanding white space. Other features and advantages of the present invention are discussed below.

BRIEF DESCRIPTION OF THE DRAWINGS

FIG. 11 is an example of a printed page;

DESCRIPTION OF THE PREFERRED EMBODIMENT

Method Overview

Figure 1:
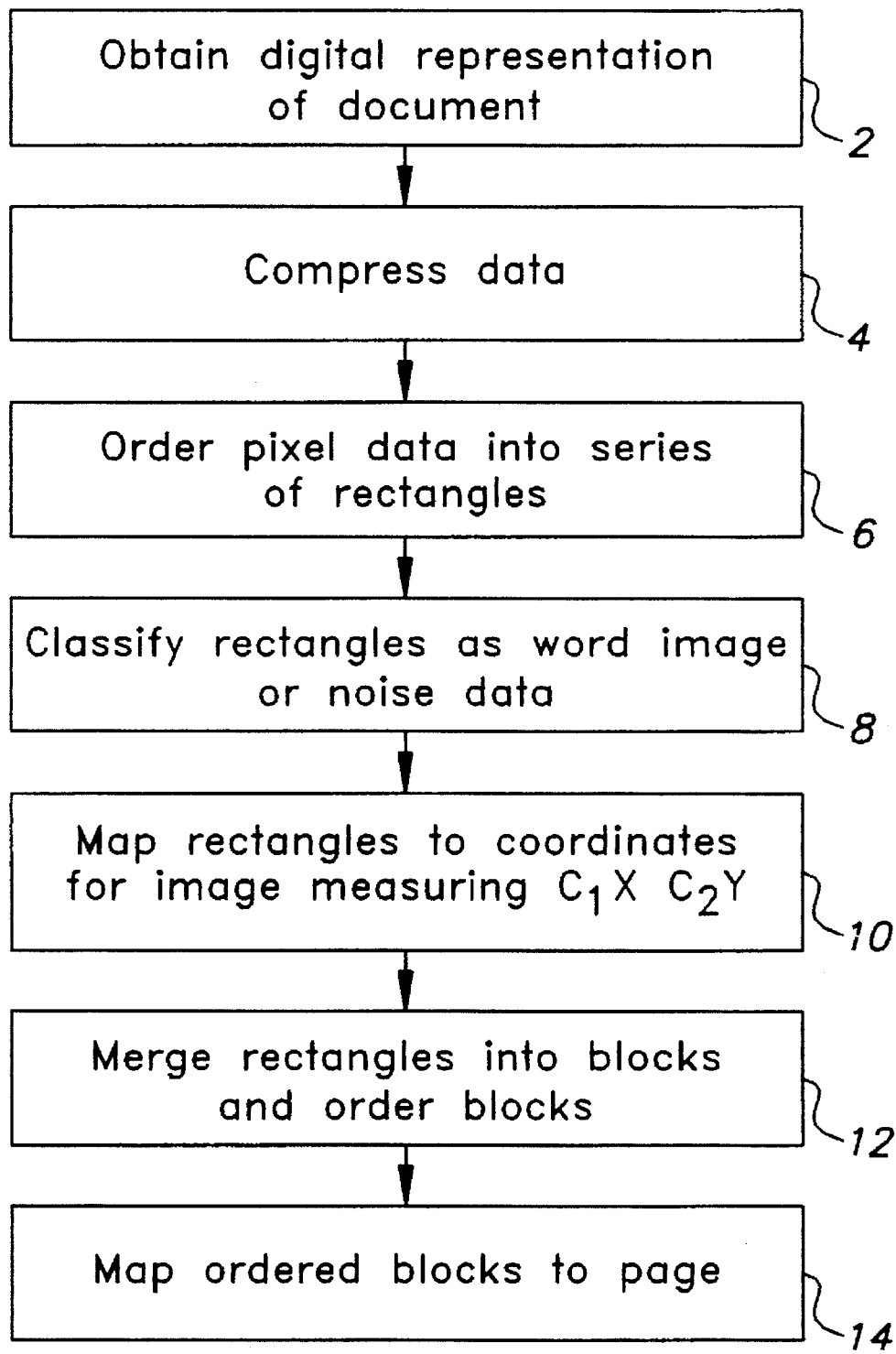
FIG. 1 is a diagram of data flow according to an embodiment of the present invention.

FIG. 1 shows a summary of the process for expanding white space according to an embodiment of the present invention. The first step 2 creates a digital representation of the physical document as rows of bits. A document scanner may be used for this purpose. Each bit corresponds to a single picture element, or pixel, of the scanned image and represents the presence or absence of white space at that location. To minimize the total amount of system memory required, the image pixel data obtained in step 2 is compressed in step 4.

In most documents, a region of white space separates words and images from one another in both the vertical and horizontal directions. A word, text, or picture image thus may be viewed as a run of predominately black pixels separated by an expanse of white pixels. The boundaries of these two regions define the edges of a rectangle containing a word or image therein. Step 6 performs the operations necessary to reclassify the document image pixel data into rectangles using the relationship described above.

Text, noise and image rectangles also possess characterizing features. For example, word rectangles tend to have smaller dimensions and smaller aspect ratios than picture image rectangles. Step 8 uses these relationships to identify text blocks from the entire set of document rectangles.

At the conclusion of step 8, coordinates for each of the document image rectangles have been identified. Given a document image measuring X pixels horizontally and Y pixels vertically, the X by Y image can be mapped to an image measuring $C_1X$ by $C_2Y$ by multiplying the coordinate values for each bounding rectangle in step 10. The resulting image is $C_1C_2$ times larger, however the basic rectangle size remains unchanged.

At this point, the whitespace has been expanded, however the text may not now fit on a single page as before. Steps 12–14 are optional steps that reorder or otherwise preserve the logical reading of the document. In step 12 the image rectangles are grouped into image and text blocks ordered in a logical sequence. Step 14 maps the ordered rectangles to the appropriate page or pages to ensure a logical reading order.

Hardware Overview

Figure 2:
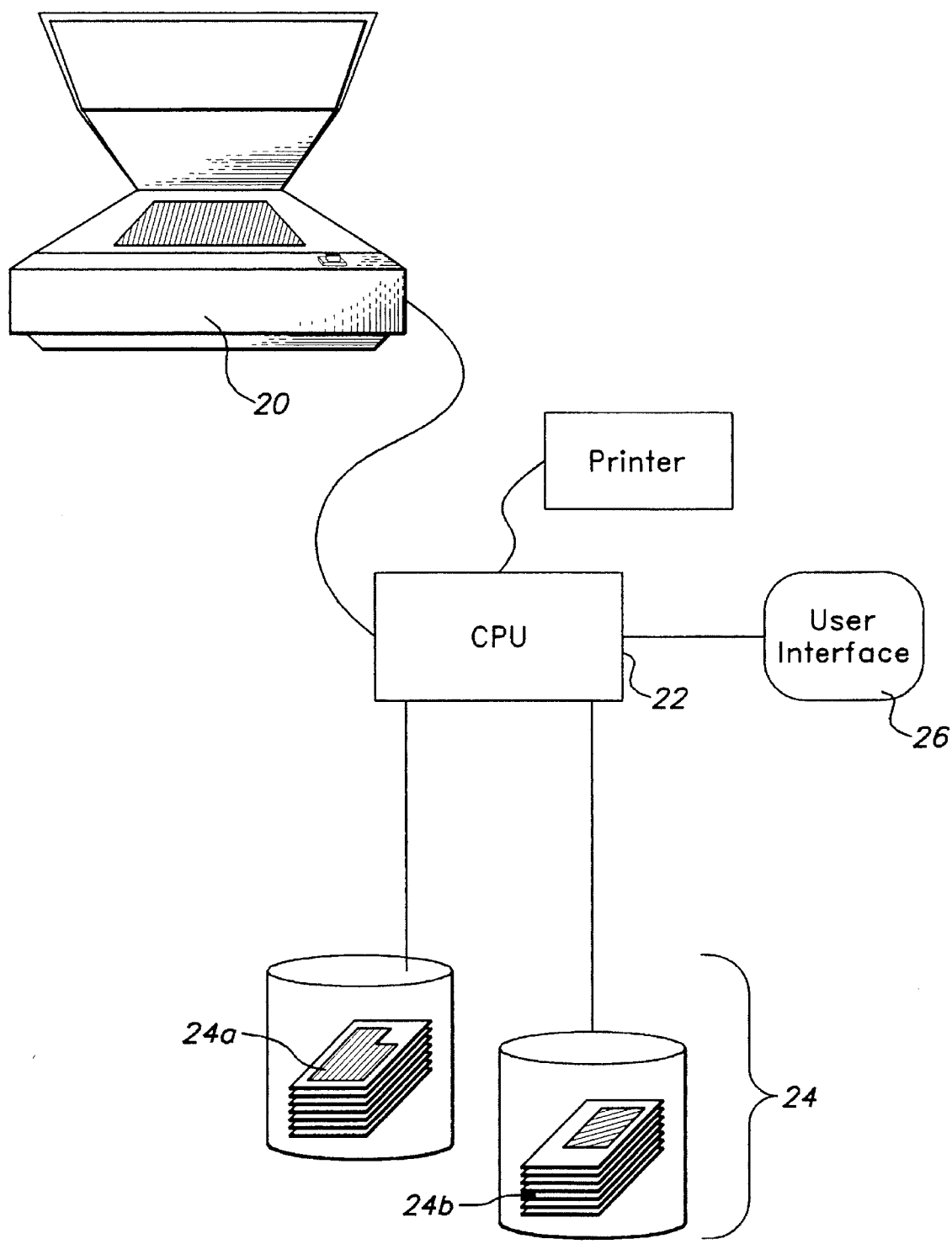
FIG. 2 is a block diagram of a system useful for implementing an embodiment of the invention.

FIG. 2 depicts a hardware configuration suitable for performing image reproduction and whitespace expansion according to a preferred embodiment of the invention. The hardware configuration may be included in a stand alone device such as a photo-copier, or be part of a local or wide area network. The document imaging system comprises a scanning device 20 which may be a charge coupled device, (CCD) coupled to a CPU 22. Other scanning devices known to those of skill in the art may also be used. CPU 22 executes commands to process the document image data according to the present invention.

CPU 22 is coupled to a memory 24 which may be any form of random access memory. Memory 24 stores the document image data and may include separate memories 24a and 24b to serve as a source and target memory as described further below. A read only memory (not shown) may also be coupled to CPU 22 for storage of commands and data executed by CPU 22.

Also coupled to CPU 22 is a user interface 26. User interface permits the document imaging equipment operator to specify the features desired for the completed document and thus directs CPU 22 to execute a subset of commands necessary to implement these features. For example, the equipment operator may specify that so many collated copies are to be made, or that the completed document is to be routed to a specific destination.

Detailed Description of Method and Hardware Operation

Figure 3A:
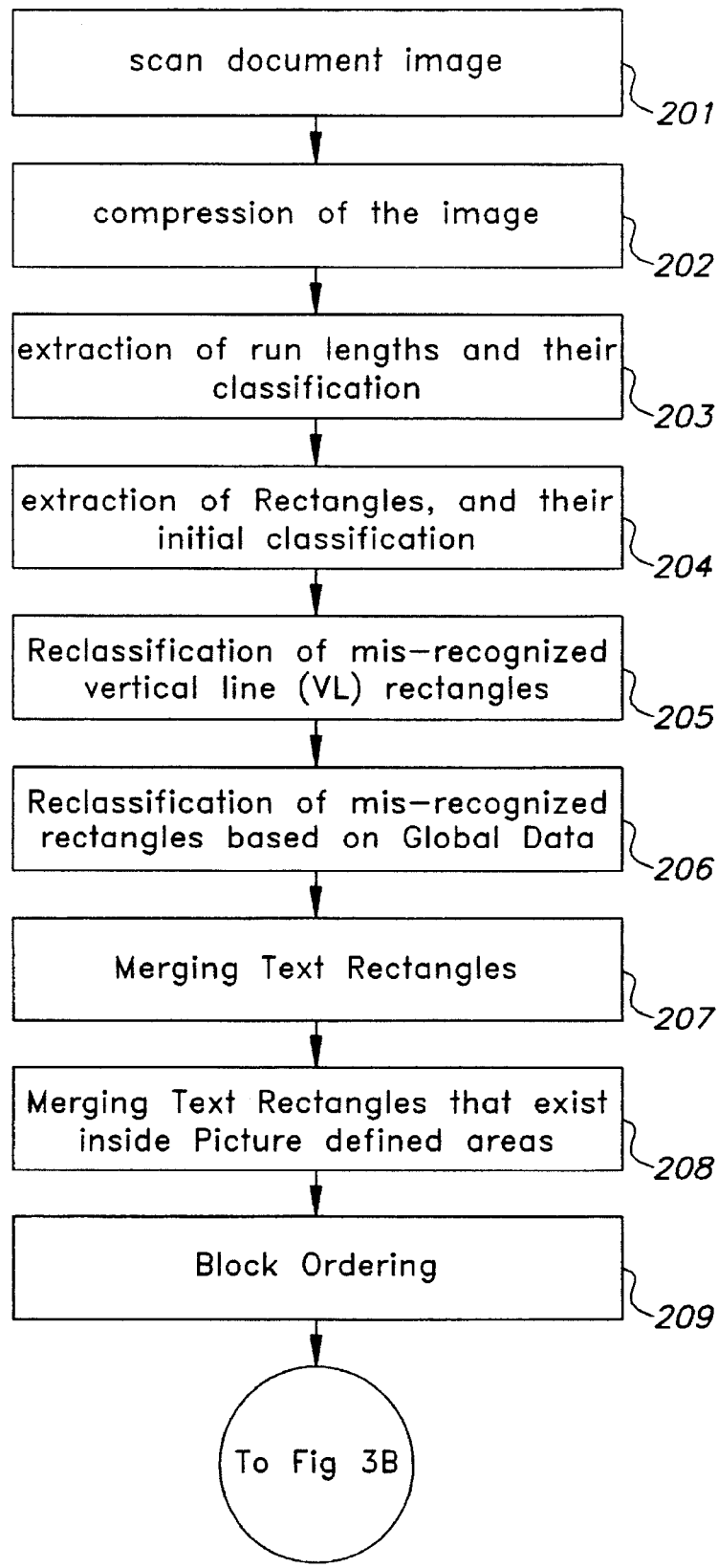
FIG. 3A is a flow chart of a method for expansion of white space according to an embodiment of the present invention.
Figure 3B:
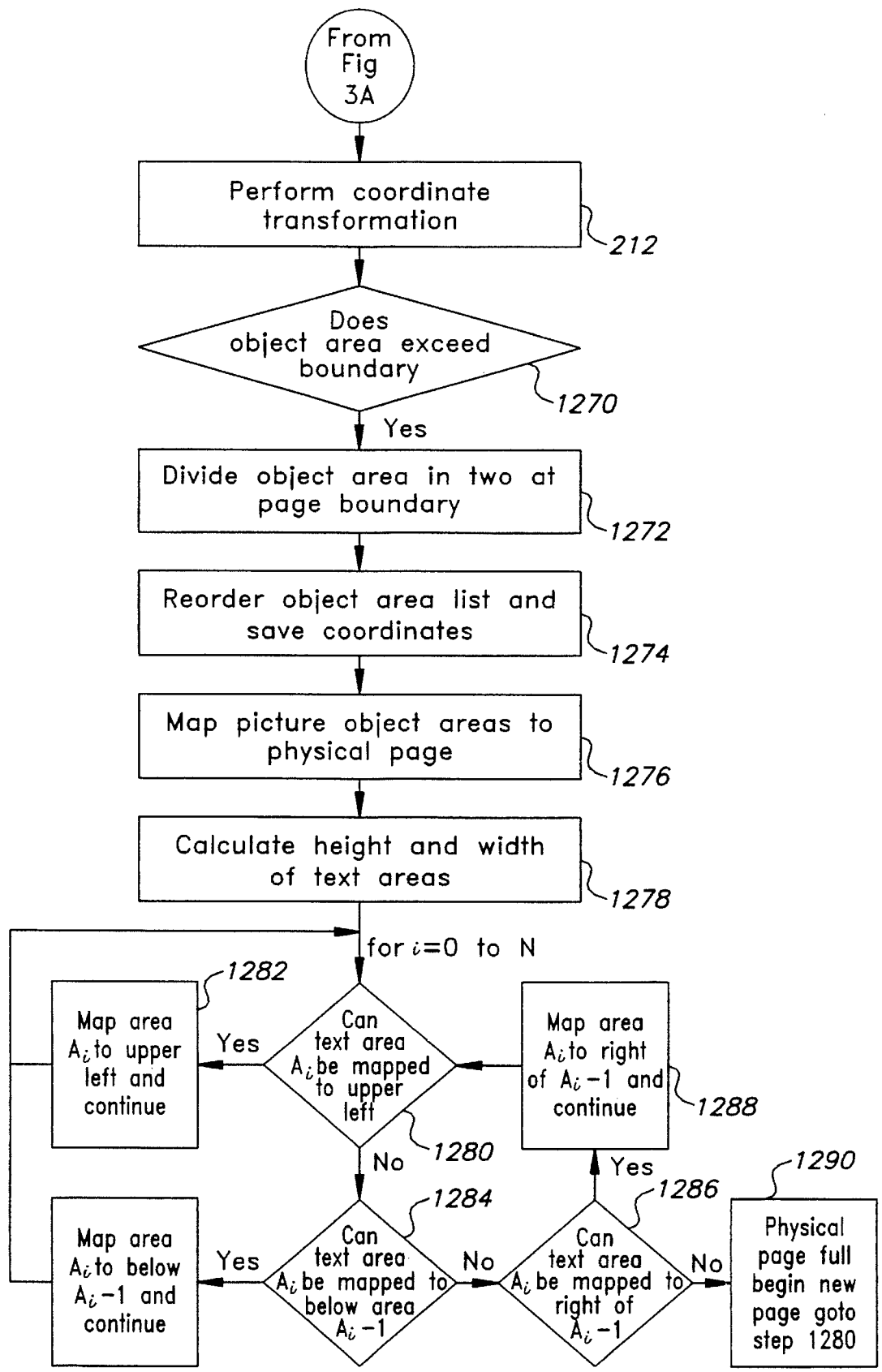
FIG. 3B is a continuation of the flow chart of FIG. 3A.

FIGS. 3A–3B contain a flow chart of a method for expansion of white space according to the present invention. In the flow of FIG. 3A, a CCD scanner or other scanning device first scans the document in step 201 to create a digital representation of the document image. Each scan line results in a row of bits that correspond to pixels of the image. In a preferred embodiment, scan lines extend from left to right. The scan direction may, however, be reoriented to correspond to the direction in which the scanned document is normally read. An arabic text, for example, may be scanned from right to left.

Compression of the bit-mapped representation occurs in step 202. The compression technique of the implemented embodiment causes a 4 to 1 reduction in the actual amount of data used to represent the document and a 32 to 1 reduction in the amount of processed data. The compression technique combines four (4) horizontal scanlines into one compressed scanline, using a logical bit-wise OR operator. The number of scanlines chosen to be compressed, i.e. 4, is based on experimentation. The choice of 4 scanlines enables processing of documents having as low as 6 point typeface. Other numbers are possible.

The compression technique of step 202 has two components; vertical compression and horizontal compression. If there exists one or more black pixels at the same location within the four vertically adjacent scan lines, then the single line resultant pixel is represented as a black pixel. If no black pixels exist at the same location within the group of four scan lines, the resultant pixel is labeled a white pixel.

Figure 4:
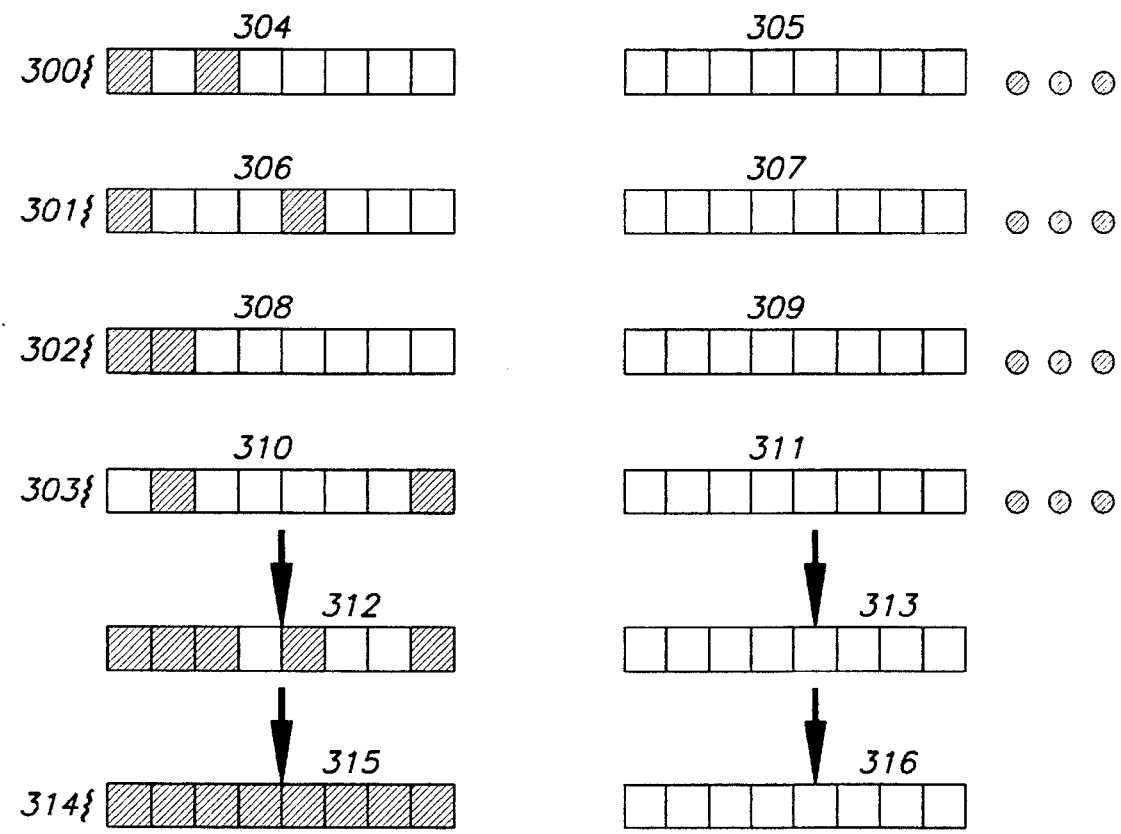
FIG. 4 is an illustration of an image data compression technique according to an embodiment of the present invention.

FIG. 4 illustrates scanline compression in the implemented embodiment. Illustrated in FIG. 4 are four scanlines 300–303, respectively, from the original, uncompressed bit-mapped representation. For each of the scanlines 300–303, two bytes are represented, 304–311, respectively. Also illustrated are resultant bytes 312–313 of vertical compression. Each of the bytes 304–311 and resultant bytes 312–313, is comprised of 8 bits.

Horizontal compression of the image data occurs after vertical compression of the image data. If a segment 312–313 contains black pixel data, the segment is represented as a single black byte of pixel data as shown on line 314 of FIG. 4. If a segment contains no black pixel data, that segment is represented as a single byte of white pixel data. The compression technique described above reduces system memory requirements. Compression techniques other than that described herein may also be used with the present invention. Optionally, compression of the data may be omitted.

After compression of the image in step 202 of FIG. 3A, analysis of the document image data organizes the data into rectangles in steps 203–204. Rectangles define the boundaries of text, picture images, and noise. To obtain the rectangle data, step 203, first describes the run length for each block of contiguous black pixels by a process called run length extraction.

In defining a run length, a first element specifies the location of the black pixel where the transition from white to black occurs, and a second element specifies where the transition from black to white, occurs. Each compressed scanline may have one or more run lengths. For each compressed scanline, a run length set, comprised of run length records is created by searching along a compressed scanline for sequences of contiguous black pixels. Sequences of contiguous black pixels are identified by examining the byte values in the scanline for non-zero logical values where a zero logical value represents a white pixel. The first pixel location of such a sequence is set as the start value for the run length. The next white pixel is then sought by examining the successive byte values in the scanline for a logical zero value. This pixel is set as the end value for the run length. In this manner all the run lengths for a scanline are extracted. Once all the run lengths for the scanline are extracted, the set is labeled as the set of run lengths existing at the nth scanline from the top of the compressed bit mapped representation.

Classification of the run length is used to make an initial classification of associated extracted rectangles. The classification rules for a 300 dots per inch scanned document, based on heuristic data are as follows:

1. Assign SHORT run length type if less than or equal to 2 pixels.

2. Assign LONG run length type if greater than 60 pixels.

3. Assign MEDIUM run length type if run length is greater than 2 pixels and less than or equal to 60 pixels.

Figure 5:
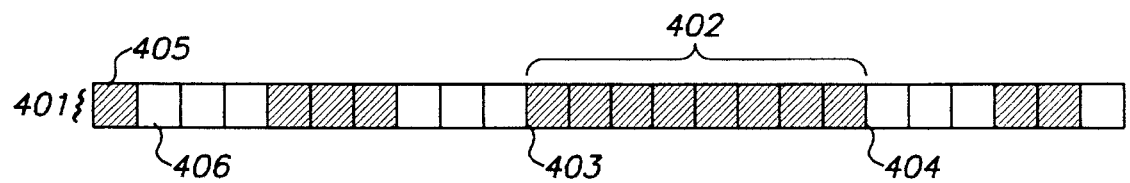
FIG. 5 is an example of run lengths according to an embodiment of the present invention.

FIG. 5 illustrates a scanline of pixels and a run length. FIG. 5 is simplified in that a byte has been reduced to its corresponding pixel value. For example, the pixel 405 represents a non-zero byte value (i.e. a black pixel) while a pixel 406 represents a zero bytes value (i.e. a white pixel). A scanline 401 has a portion 402 comprised of a series of contiguous black pixels. The address of a pixel 403 designates the start of the run length, while the address of a pixel 404 designates the end of the run length. Assuming that the pixel 403 is at address 312 and the pixel 404 is at address 440 and that the threshold for a long run length is 100, the resulting run length record would have starting position value 312, an ending position value 414 and the run length flag value for a long run length.

As the run lengths are extracted on the compressed scanlines, rectangles describing the features of the document are being constructed. These rectangles describe the bounds of contiguous black pixels in both the horizontal and the vertical directions in the document image. Run lengths are one dimensional, whereas rectangles are two dimensional.

At any point in the processing, only two sets of records describing the run lengths of two compressed scanlines are utilized and stored in memory. A first set of records describe the current scanline run lengths, and a second set describes the previous scanline run lengths. The previous scanline information is used for rectangle extraction. Prior to reading a new set of compressed scanline records, the old current set of records is copied to the memory location for holding the records of the previous scanline. The records describing the new scanline are then read into the memory location for holding the records describing the current scanline and is processed accordingly.

Relationships between the current compressed scanline and the previous compressed scanline determine whether the current compressed scanline run lengths get assigned to existing rectangles, or if a new rectangle is created. When the first compressed scanline is processed, each run length defines a rectangle. As each new current compressed scanline gets processed, run lengths are associated with a rectangle in the preexisting line or are used to define the boundaries of a new rectangle. A run length is associated with a preexisting rectangle if any portion of the run length exists within the boundary of the rectangle. A rectangle is complete and no longer gets expanded when all of the pixels of the current compressed scanline that are adjacent to the rectangle are white. In other words, a rectangle terminates when no run lengths of the current compressed scanline lie within the rectangle boundary. A new rectangle is created when a run length is not completely within the boundary of a rectangle. Such a scheme allows for the creation of rectangles which overlap. Overlapped rectangles are further processed in subsequent steps.

Figure 6:
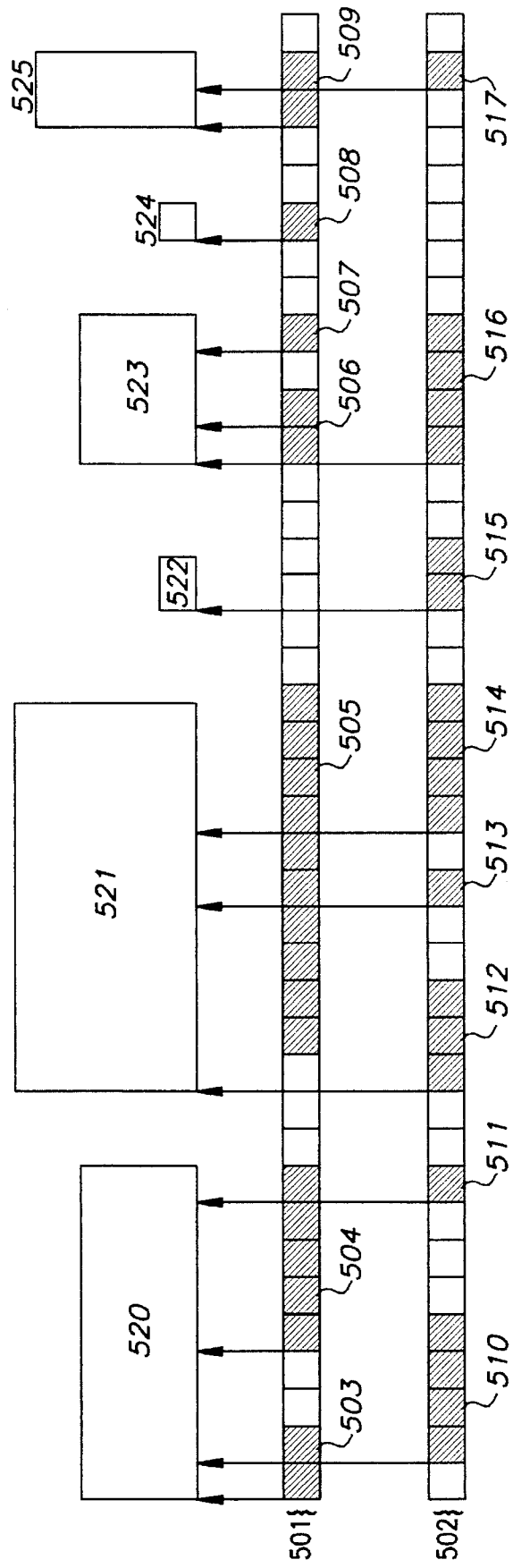
FIG. 6 is an illustration of the reduction of run length data to rectangle data according to the present invention.

Construction of a rectangle from run lengths is illustrated in FIG. 6. In FIG. 6, a previous compressed scanline 501 and a current compressed scanline 502 each contain a plurality of run lengths. The previous compressed scanline 501 has run lengths 503–509 while the current compressed scanline 502 has run lengths 510–517. As illustrated, scanlines 501 and 502 are bit-wise aligned. Thus, the left most bit in the scanline 501 corresponds to the left most bit in scanline 502.

FIG. 6 also shows previously defined rectangles 520–525. The relationship that must exist for a run length 503–509 and 510–517 to be added to an existing rectangle is that the starting point for a run length in the current scanline must have continuity with a run length in the previous scanline. For example, in FIG. 6, the starting point for run length 510 has continuity with run lengths 503 and 504 of compressed scanline 501. With respect to run length 515, no continuity exists with a run length in the previous scanline 501. Thus, the new rectangle 522 is created. For run length 508 in the previous scanline 501, there is no continuity to a run length in the current scanline, thus the rectangle 524 is completed.

In FIG. 6, the run lengths of scanline 501 add to existing rectangles as follows: run lengths 503–504 add to rectangle 520, run length 505 adds to rectangle 521, run lengths 506–507 add to rectangle 523 and run length 509 adds to rectangle 525. Run length 508 causes the creation of rectangle 524. With respect to scanline 502, run lengths 510–511 add to rectangle 520, run lengths 512–514 add to rectangle 521, the run length 516 adds to rectangle 523 and run length adds to rectangle 525. Run length 515 causes the creation of rectangle 522. As rectangles are being constructed, a count is kept of the different types of run lengths that comprise each rectangle. When a completed rectangle has been defined initial rectangle classification is performed. Rectangles are classified into one of four types: vertical line (VL), horizontal line (HL), picture image (IMG), or unknown (UNKNOWN). The following general rules, again scaled to document resolution, are used to make the classification:

1. IF (Run lengths are all of Type Long) AND (Rectangle Height is less than or equal to the Runlength Type Short threshold) THEN classify rectangle as type HL.
2. IF (Run lengths are all of Type Short) AND (Rectangle Height is greater than the Runlength Type Short threshold) THEN classify rectangle as type VL.
3. IF ((Run lengths are Type Long) OR (Rectangle width is less than or equal to the Runlength type Long Threshold)) AND (Rectangle Height is greater than an Image Height Rectangle Threshold) THEN classify rectangle as type IMG.
4. Classify all remaining rectangles as UNKNOWN.

Note that rule 1 identifies horizontal lines, rule 2 identifies vertical lines, rule 3 identifies image rectangles and rule 4 provides a default unknown classification. For a 300 dot per inch document image, the threshold values Runlength Type Short threshold has been determined to be 2 pixels while the Image Height Rectangle Threshold has been determined to be 82 pixels. The above classification rules are constructed from known parameters of what a typical document should contain. These parameters may be modified depending on the resolution of the bit-mapped representation of the document, and/or may be tuned to a specific document by analyzing the rectangle size distribution. At the end of step 204 of FIG. 3A, a list of rectangles describing all the basic objects in the document image will have been created and initially classified. Some text may be misclassified at this stage as vertical line or unknown segments. For example, the characters "I", "l" and "1" are frequently misclassified. Therefore, in step 205 the following rules test and refine the initial classification made:

Rule 1: corrects for misclassified text, namely, 1, 1 or 1 that were classified as vertical lines IF (rectangle type is VL) AND (rectangle height is less than threshold height for unknown rectangles) THEN (classify rectangle as type UNKNOWN)

Rule 2: re-assigns rectangles based on font size. If greater than maximum font size, they must be pictures. IF(rectangle height, scaled by a factor of 2) is greater than (threshold for picture height) THEN (classify rectangle as type IMG)

Rule 3: assigns image areas based on the premise that words tend to be longer than they are high. IF ((rectangle height scaled by factor of 4) added to (rectangle width)) is greater than (threshold for picture height scaled by a factor of 4) THEN (classify rectangle as type IMG)

Rule 4: describes the criteria for defining a horizontal line based on the premise that loner horizontal lines tend to be thicker than short horizontal lines that divide text blocks or columns. IF ((rectangle width) as a ratio (rectangle height scaled by a factor of 4)) is greater than (threshold for width of horizontal line) THEN (classify rectangle as type HL)

Rule 5: describes the criteria for differentiating a horizontal line from a long line of small (e.g. 6 point) font text. IF ((rectangle width) as a ratio of (rectangle height)) is greater than (threshold for horizontal line width height ratio) THEN (classify rectangle as type HL)

For a 300 dot per inch image, the values for the various thresholds are: Threshold height for unknown rectangles is 5, threshold picture height is 82, threshold width of a horizontal line is 77 and threshold for horizontal line width height ratio is 15.

At the conclusion of step 205 an accurate classification of image picture areas, vertical lines and horizontal lines exists. All other rectangles have been classified as UNKNOWN. These UNKNOWN rectangles represent the text in the document or any text-like noise. Optionally, the process of the present invention may include the steps of skew determination and skew correction as described in application Ser. No. 07/864,423, titled: "Segmentation of Text Picture and Lives of Document Image", filed Apr. 6, 1992. Skew determination and correction is useful in defining column edges. In one embodiment of the present invention, however, the next process in step 207 of FIG. 3A finds rectangles that can be merged into blocks that can be classified as lines of text. Such merged blocks are classified as type CHAR. A grouping of merged UNKNOWN rectangles is thus a text block.

Merger between two rectangles occurs when the rectangles are of the same type and are within a predetermined horizontal or vertical merge threshold, respectively. Rectangles of type IMG do not merge. Merge thresholds are dependent on image resolution and average rectangle height. TABLE I illustrates typical thresholds for a document with 300 dot per inch resolution.

TABLE I

| | MERGER THRESHOLDS | | |
|---|---|---|---|
| Average Rectangle Threshold | 2 = <X <10 | X> = 10 | X< = 2 |
| Horizontal Merge Threshold | 5 pixels | 10 pixels | 3 pixels |
| Vertical Merge Threshold | 5 pixels | 10 pixels | 3 pixels |

The merging process involves both horizontal merger and vertical merger. In horizontal merger, care must be taken not to merge text rectangles that may be adjacent, but in different columns. Skew angle detection may be used to define the column edges when included as part of step 206. During the horizontal merger step, rectangles that are classified as UNKNOWN and smaller in boundary length than threshold noise length, are deleted as noise. Remaining horizontally merged rectangles are classified as text (i.e. assigned type CHAR).

The vertical merger step takes horizontal lines of text and merges them in the vertical direction. If an overlap exists between a text rectangle and a rectangle of type IMG, HL, or VL, then these rectangles are deferred for later processing.

In the case of a rectangle internal to an image rectangle, merging is performed using the same merge parameters as described above. Rectangles that overlap an IMG rectangle boundary do not merge.

The next step 209 of the process logically orders the blocks of text. Step 209 is an additional, optional step. Inclusion of step 209, however, facilitates the mapping of text blocks to a page in a logical reading order after expansion of white space. Step 209 may be performed before or after the expansion of white space. Step 209 as well as steps 201–210 are described in greater detail in application Ser. No. 07/864,423, titled, "Segmentation of Text, Picture and Lines of a Document Image," filed Apr. 6, 1992.

Figure 7:
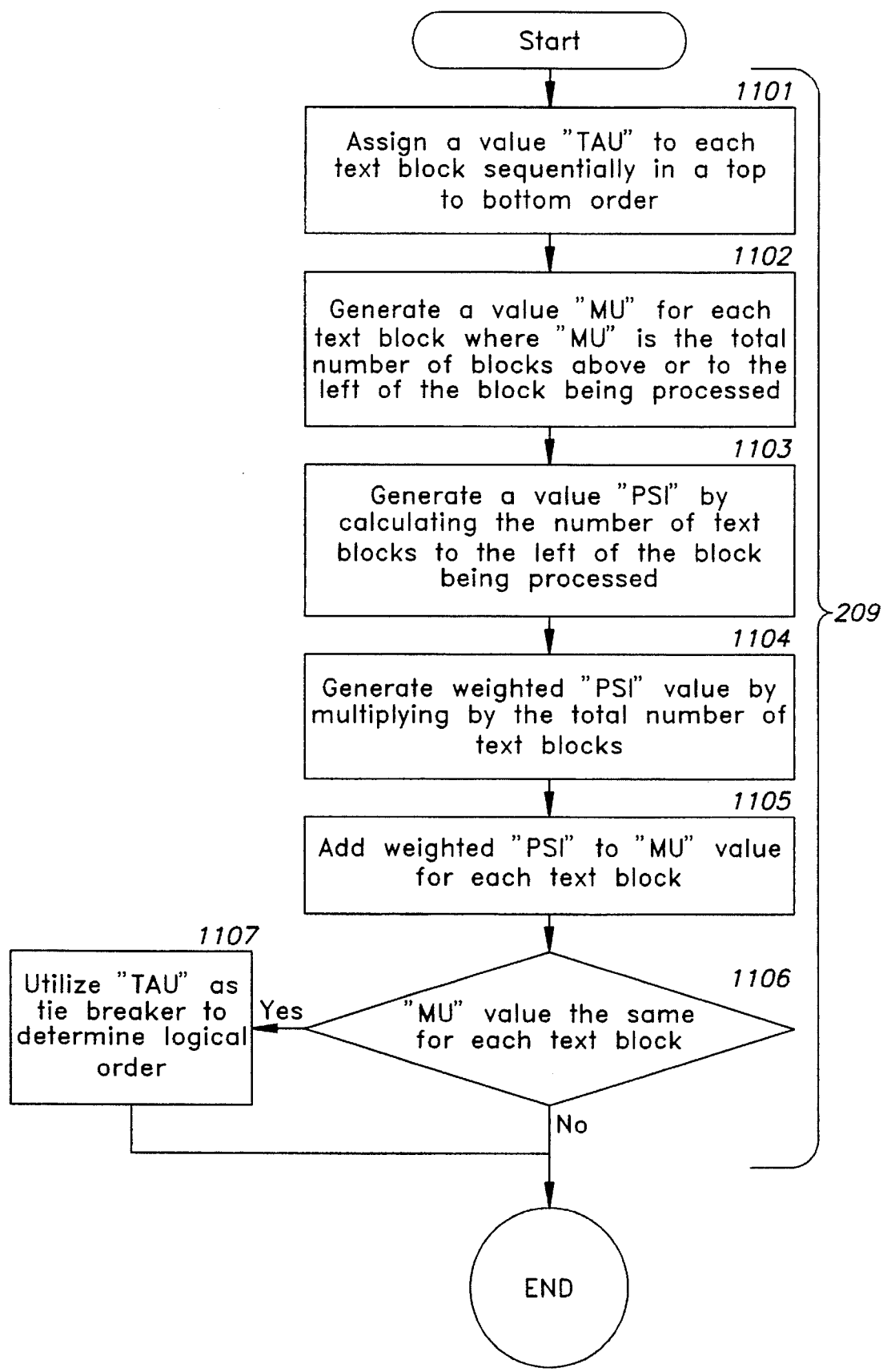
FIG. 7 is a flow chart of a text ordering method according to an embodiment of the present invention.
Figure 8:
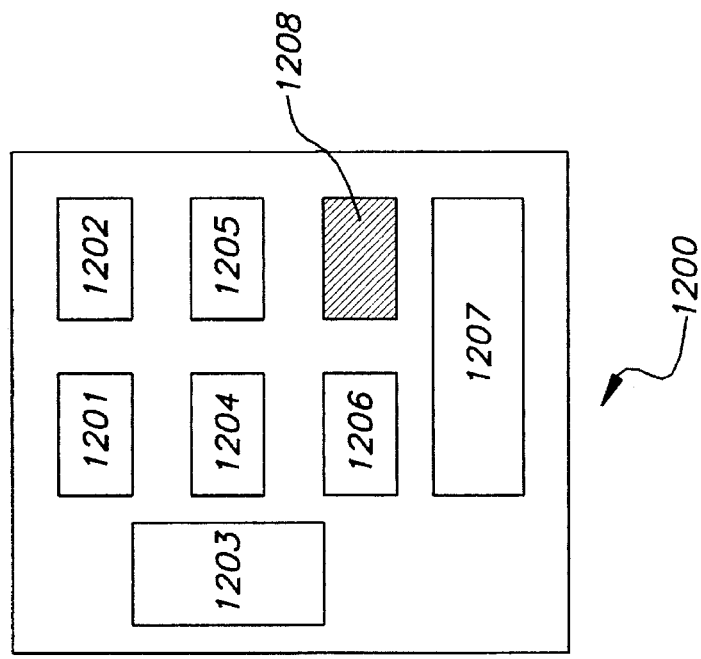
FIG. 8 is a document image of text blocks ordered according to an embodiment of the present invention.

The ordering method of step 209 counts the number of text blocks 'above' and 'to the left of' the block under consideration. 'Above' and 'to the left of' are in reference to the geometrical layout of a document. The block ordering method of the present invention is described with reference to FIGS. 7 and 8. FIG. 7 is a flowchart illustrating the steps taken in order to determine the logical block ordering of the various text blocks on a document image. FIG. 8 illustrates a document image and a resulting value table used to calculate the logical ordering of the text blocks.

In FIG. 7, a first step 1101 assigns a 'TAU' value to each text block in the document. The 'TAU' values are assigned in sequential order starting from 1, from the top to the bottom of the document image. Note that this is typically the same order in which the text blocks are constructed.

Figure 12:
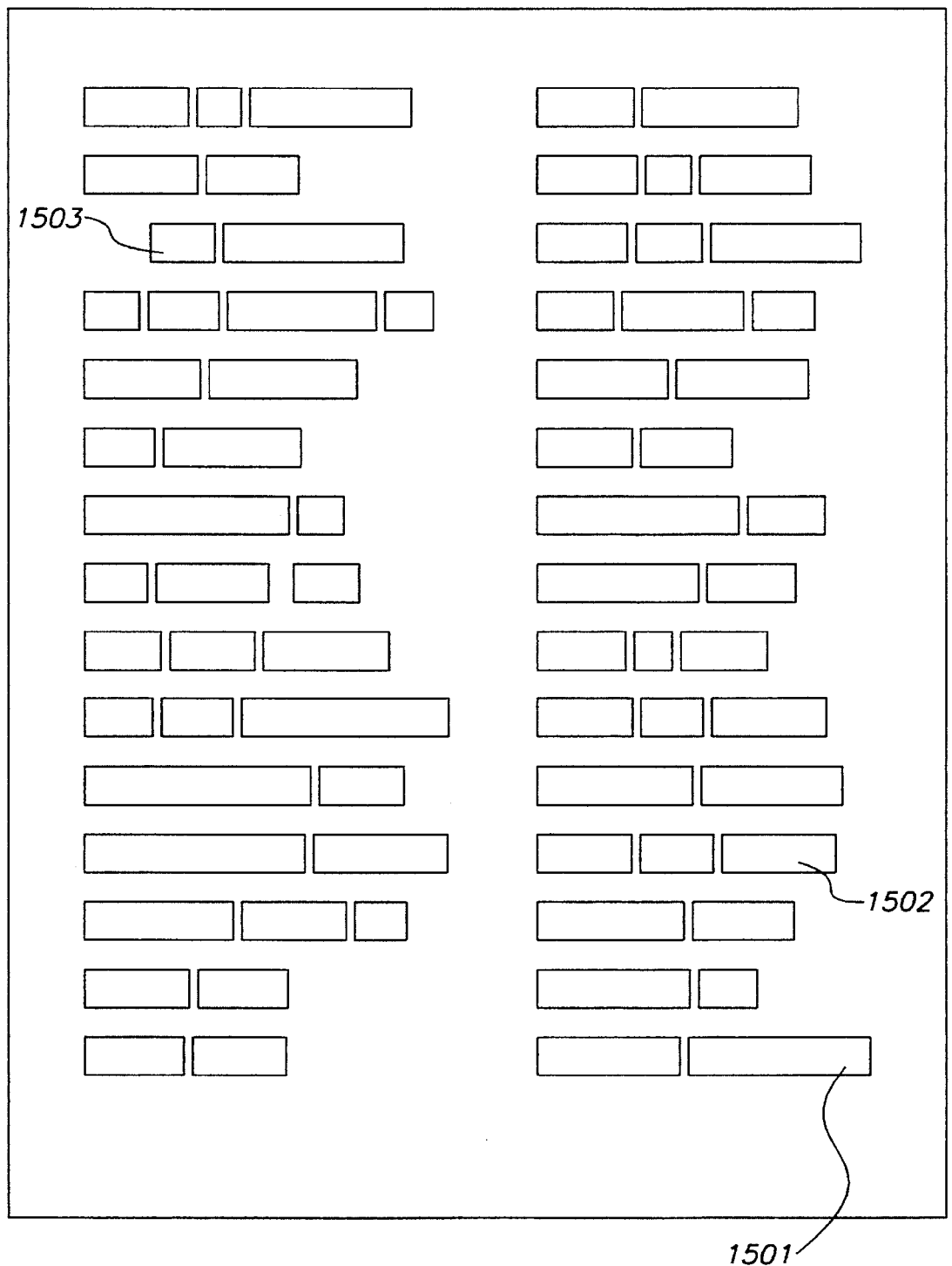
FIG. 12 is a diagram of the example page of FIG. 11 showing the extraction of rectangles according to an embodiment of the present invention.

In FIG. 8, a document image 1200 with text blocks 8 1201–1207 is illustrated. Further illustrated in FIG. 12 is a image rectangle, 1208. Image rectangle 1208 is not assigned a 'TAU' value. Traversing the document in a left to right top to bottom order, the left-most top text block is the block 1201. Thus, the text block 1201 is assigned a 'TAU' value of 1. The next text block to satisfy the left-most top to bottom criteria is text block 1202. Accordingly, the text blocks 1202 is assigned a 'TAU' value of 2. This continues until a 'TAU' value of 7 is assigned to text block 1207. The 'TAU' value of each of the text blocks 1201–1207 is illustrated in Chart 1220. Here a 'TAU' row, 1210 indicates all the 'TAU' values for each of the text blocks. The 'TAU' sequence of ordering the blocks is termed the geometric order of the text block.

Once the 'TAU' values have been generated, the next step is to generate a 'MU' value for each text block, step 1102. FIG. 8, row 1201 of chart 1220 illustrates the 'MU' values generated for text blocks in the document image 1200. For example, the 'MU' value for the text block 1204 is 4 because the text blocks 1203, 1201 and 1202 satisfy the criteria of being above or to the left of the block. The 'MU' value of the text blocks provides a logical ordering from a left to right top to bottom stand point.

In general, the evaluation of 'MU' weights the top to bottom geometrical order by considering the left to right position in the page. The resultant is a value giving an order top/left to bottom/right. However, if text blocks are aligned top to bottom in the document, the precedence must be given to reaching the bottom of the text column before proceeding to the next text block to the right. Such a precedence is enabled by calculating a value 'PSI' for each text block.

In step 1103 of FIG. 7, a 'PSI' value is then calculated for each of the text blocks in the document image by summing the number of text blocks to the left of the block being processed. The 'PSI' value provides a means for ordering text when they are in a column format. FIG. 8, row 1212 of chart of 1220 illustrates the generate 'PSI' values. For example, the text blocks 1205 has a 'PSI' value of 5. This is because the blocks 1201–1203, 1204, 1206, and 1207 satisfy the criteria of being to the left of the text block 1205.

In FIG. 7, the next step 1104, weighs the 'PSI' value by multiplying the original 'PSI' value by the number of text blocks. This weighing step provides a more accurate logical ordering of the text blocks. In FIG. 8, the weighted 'PSI' value is illustrated by row 1213 of chart 1220.

To determine the final logical ordering, the weighted 'PSI' is added to the 'MU' value for each text block in step 1105. This resulting value gives an approximation of the logical ordering of the text blocks on the document. In FIG. 8, the results of this step is illustrated in row 1214 of chart 1220. Step 1186 then determines whether or not there are any weighted 'PSI' and 'MU' values which are equal. If any of the values are the same, then the block ordering does not provide useful information, as multiple text blocks would have the same logical ordering value. If no 'MU' values are the same, then the text block ordering process is completed. If there are 'MU' values which are identical, then the geometric ordering of the text blocks is considered, step 1107. Recall that the geometric ordering is the previously calculated 'TAU' value.

In FIG. 8, no text blocks have the same 'MU' value. Thus, the resulting order for the text blocks of document image 1200 is 1203, 1201, 1204, 1206, 1207, 1202, and 1205. This document is in a column type format, as found in newspapers and magazines. Once the block ordering is completed, the text blocks can be provided to a character recognition program for providing a logical ordering of the characters on the document page. As the representation of the image has been compressed, the actual coordinate addresses corresponding to the blocks must be provided. This is accomplished by re-scaling the representation back to the dimensions of the original, uncompressed document image.

Once the coordinates of the text blocks comprising the document image have been identified at least by steps 201–204 and optionally by steps 205–211, document white space expansion proceeds as described in steps 212–1290 of FIG. 3B.

From the previous steps, the X, horizontal, and Y, vertical dimensions of the document image are known. Step 212 maps this document image to an imaginary larger sheet of paper having dimensions $C_1X$ by $C_2Y$. Memory 24 stores a set of coordinates $(x_0,y_0)$; $(x_n,y_m)$ for each of the bounding rectangles defined by steps 201–204 and optionally by steps 205–211. Step 212 maps each rectangle from the X by Y document space to the $C_1X$ by $C_2Y$ space by making the following transformations:

$$x_{02} \to C_1 x_0$$

$$x_{n2} \to C_1 x_0 + (x_n - x_0)$$

$$y_{02} \to C_2 Y_0$$

$$y_{m2} \to C_2 Y_0 + (y_m - y_0)$$

and in general $$x_i \to C_1 x_0 + (x_i - x_0)$$

$$y_j \to C_2 Y_0 + (y_j - y_0)$$

Figure 9:
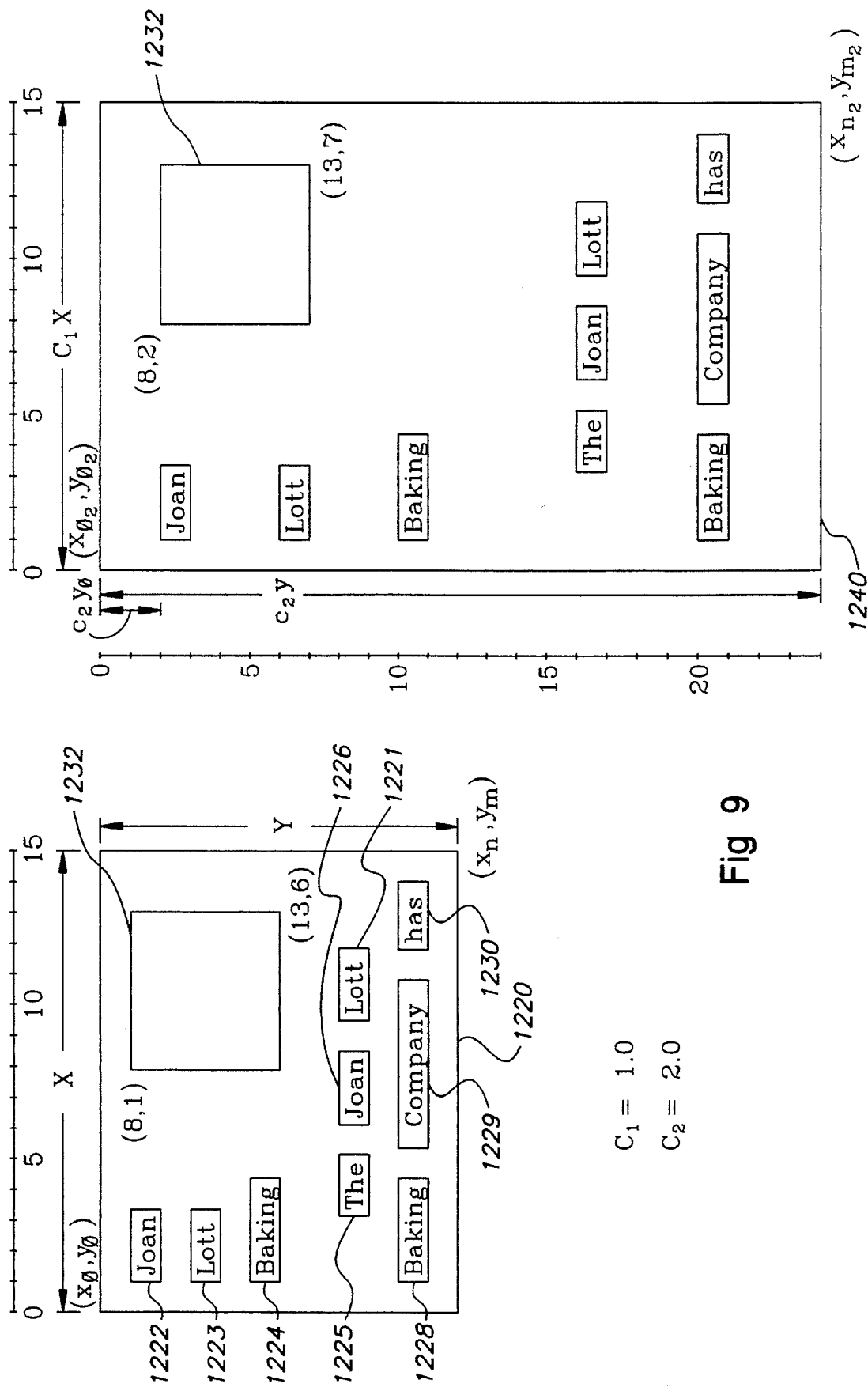
FIG. 9 is a diagram of basic expansion mapping according to an embodiment of the present invention.

FIG. 9 shows the mapping process of step 212. In FIG. 9, a document image 1220 contains text rectangles 1222–1230 and picture image 1232. Document image 1220 has dimensions X, Y. Document image 1240, to the right of document 1220 corresponds to the constructive document image produced by the coordinate mapping procedure. Note the dimensions of the bounding rectangles themselves do not change. The transformation from document image 1220 to 1240 operates solely to increase the white space between text areas. In the example of FIG. 9, constant $C_1$ equals unity while $C_2$ is greater than unity. Therefore, white space expansion in this example occurs only in the vertical direction.

The process of step 212 of FIG. 3B creates an additional set of document image records. The first set of document records, corresponds to the document rectangle data of the original. The first set of records may be stored in object memory, for example memory 24a of FIG. 2. The second set of records corresponds to the document rectangle and associated coordinate data that exists after the transformation of step 212. The second set of records may be stored in target memory, for example memory 24b of FIG. 2.

At the conclusion of step 212 and storage of the target memory data, image 1240 may be converted to tangible physical form having dimensions of at least $C_1X$ by $C_2Y$. However, a physical representation of the expanded document image may exceed the limitations of the current physical medium. For example, the document operator may wish to print the expanded white space document on the same size paper as the original document, and the newly mapped document no longer fits. In addition, the expanded document may have columns that now appear out of sequence.

Figure 10B:
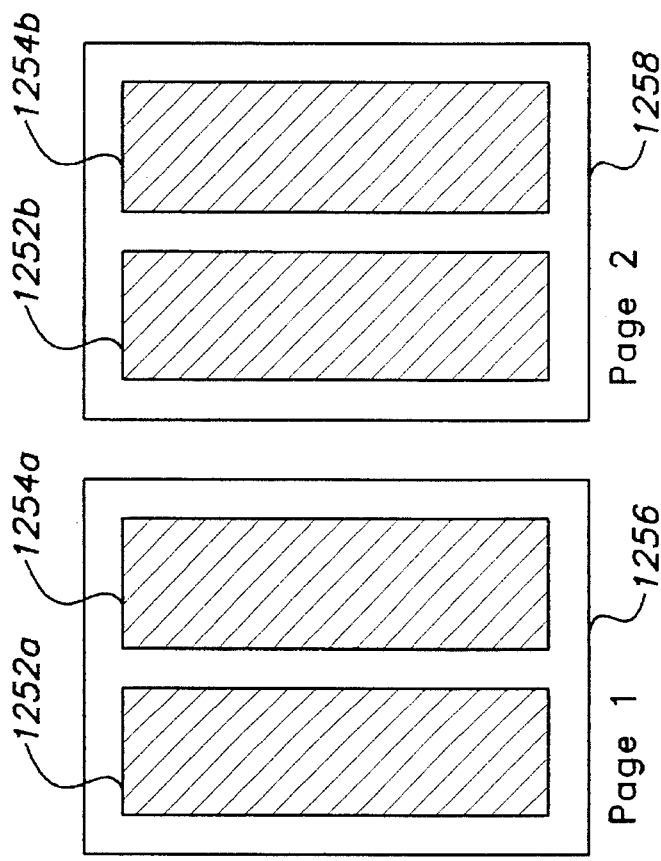
FIG. 10B is the document image after whitespace expansion according to an embodiment of the present invention.
Figure 10A:
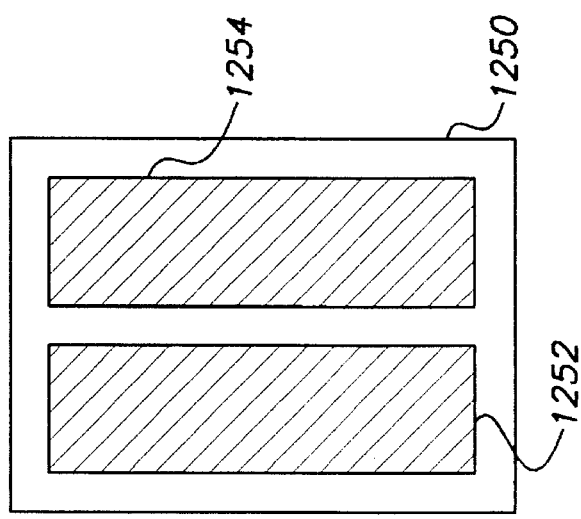
FIG. 10A is a document image having two columns of text.

FIG. 10A shows a document image 1250 having two columns of text 1252 and 1254. FIG. 10B shows document image 1252 after white space expansion. In FIG. 10B, column 1252 now appears as columns 1252a and 1252b located on separate pages. Column 1254 also appears as columns 1254a and 1254b located on separate pages yet retains its orientation adjacent column 1252a and 1252b. This sequence of the columnar information requires the reader to read column 1252a on page 1256, column 1252b on page 1258, then return to page 1256 to read column 1254a. A preferred embodiment of the present invention also provides for the preservation of logical reading order and text column continuity in addition to white space expansion. Steps 1280–1290 of FIG. 3B flow chart show this process.

In step 209 of FIG. 3A object areas were ordered in sequence. An object area defines the coordinates for a set of rectangles contained within its bounds. In step 212 of FIG. 3B, the coordinates for the text rectangles and object areas were mapped to new coordinates. In step 1270 of FIG. 3B the end coordinates for each object area are compared to the coordinates of the physical page boundary. The physical page boundary need not necessarily coincide with a tangible page edge. For example if one centimeter margins are desired on a piece of A4 paper, the physical boundary may be set to correspond to the coordinate one centimeter from the bottom of the page.

If the physical area coordinates exceed the physical page boundary coordinates, step 1272 divides the object area into two object areas at the physical area boundary. The first of the resulting object areas thus has an end coordinate coincident with the physical area boundary and the second of the object areas has a beginning coordinate coincident with the physical area boundary.

The process of step 1272 thus creates a new list of object areas and associated coordinates. In step 1274, the newly created, second object area is inserted in the list of object areas in sequence after the first object area. All subsequent object areas in the list must then increment their order number.

The object areas existing at the conclusion of step 1274 include picture and text object areas. Step 1274 maps the picture areas to the new expanded coordinates as determined by step 212. Initially, no text areas are mapped. For each remaining area not yet mapped, step 1278 determines the area height and width. Text regions are then mapped beginning at the upper left corner of the page area provided no previously mapped picture or text area exists at that location, steps 1280–1282. If the current area does not interfere with a previously mapped picture area at this location, the text area is mapped and its location fixed.

If a picture or text image exists in the upper left corner of the document page, the current area gets mapped either below or to the right of the previously mapped area. In step 1284 an attempt is made to map the current area below the previously mapped area by checking that the end coordinates for the current area do not exceed the page boundary. If the page boundary is not exceeded, the current area is mapped to this location and shares an X coordinate with the previously mapped area.

If the current page boundary is exceeded, steps 1286–1288 attempt to map the current area to the right of the previously mapped area. The X and Y coordinates for the current area mapped to this location are checked to ensure the page boundary is not exceed. If the page boundary is not exceeded, step 1288 maps the area to this location. Areas mapped to the right of an existing area share a Y coordinate.

If the current area cannot be mapped to a location below or to the right of a the previously mapped area, then the document image page is assumed full and a new page started in step 1290. Assignment of image areas to the new page proceeds in the same manner as previously described.

Mapping of areas in the form described by steps 1270–1290, ensures preservation of logical reading order. Areas are mapped either below the previously mapped area or to the right of the previously mapped area. Areas are never mapped to the left or above the previously mapped area. In this fashion, a logical reading order is preserved.

Illustrative Example

The present example illustrates use of the invention on a photocopier device. The example is offered as an illustration of the present invention. The invention may be used in other devices and applications and is not limited to the example described below.

FIG. 11 is the first page 1299 of a multipage document that is to be photocopied on a device incorporating the present invention. The document image of FIG. 11 contains two columns of text 1301 and 1302. At the photocopier, the operator selects the desired document features using the user input device. These features may include the number of copies to be made, collating features as well as the selection of the white space expansion feature.

Figure 13:
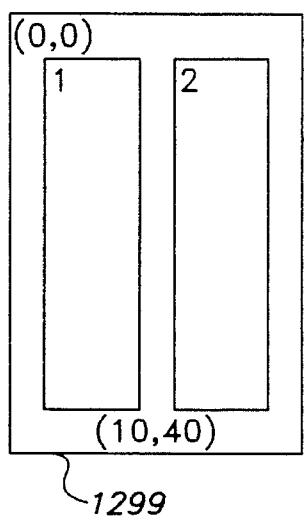
FIG. 13 is a representation of the document page of FIG. 11 wherein text blocks have been merged and ordered according to an embodiment of the present invention.
Figure 14:
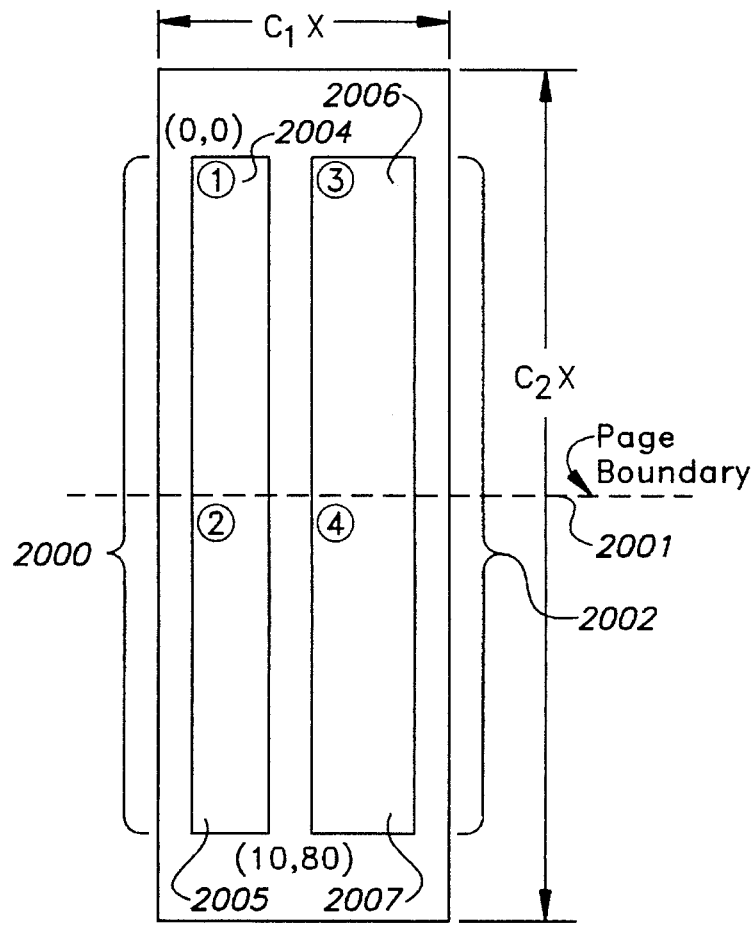
FIG. 14 is an illustration of the document of FIG. 11 after white space expansion according to an embodiment of the present invention.

After selection of the desired reproduction features, a CCD scanner scans page 1299 to obtain a characterization of page 1299 as a pixel image. In FIG. 12, a representation of the image as a set of extracted rectangles is illustrated. FIGS. 12–14 merely provide a pictorial illustration of the processes of the present invention, and need not ever be a physical manifestation of these processes. Each rectangle of FIG. 12 corresponds to a word, string of words or an image. Each of the areas, for example, 1501–1503 have a direct relationship with an area of FIG. 11. For example, area 1501 corresponds to the word "buildings" at the end of column 1302 FIG. 11.

In FIG. 13, the rectangles of type UNKNOWN have been merged to form text blocks and the text blocks ordered. The order is indicated by an integer value located in the upper left portion of the text block. In this example the text blocks correspond to the two columns of the document image. The text blocks have the known coordinates. Thus, upon character recognition and reducing the document image to a text file, the text will appear in that file in the indicated order.

FIG. 14 illustrates the mapping of the text blocks of FIG. 13 after expansion of white space. In the present example $C_1$ equals 1 and $C_2$ equals 2. These values have been found suitable for 8½ by 11 inch sheets of paper, although other values are possible. Therefore in the present example, text block 1, originally located at coordinates (0, 0) and (10, 40) gets mapped to coordinates (0, 0) and (10, 80) forming block 2000.

Also shown in FIG. 14 are the coordinates of the physical page boundary 2001 for the document image. As seen in FIG. 14, both text blocks overlap this boundary. Text blocks 2000 and 2001 are therefore divided at the junction of page boundary 2001. Four text blocks 2004–2007 result. The creation of new blocks 2005 and 2007 causes the renumbering of all blocks as shown.

Figure 15:
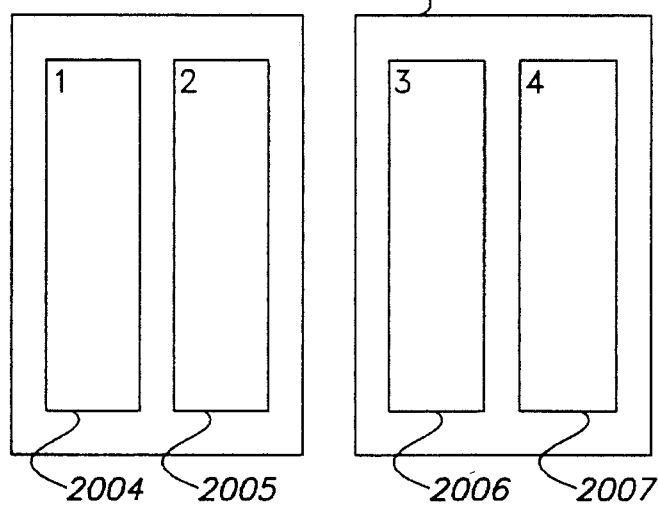
FIG. 15 is an illustration of the document of FIG. 14 mapped to a physical page according to an embodiment of the present invention.

FIG. 15 shows the mapping of the text blocks to the physical page. The first numbered text block 2004 is mapped to the upper left corner of the first page. Block 2004 is mapped to this region because it is the first block mapped to the new page and mapping to this region does not interfere with any previously mapped picture image area.

Next, the present invention attempts to map text block 2005 below text block 1. Text block 2 cannot fit in this region because it overruns the physical page boundary. Therefore, the present invention MAPS block 2005 to the right of block 2004. Block 2005 shares the Y coordinate of previously mapped block 2004.

An attempt is then made to map block 2006 immediately below block 2005. Block 2006, however, cannot be placed at this location because it too would exceed the physical page boundary. An attempt is then made to map block 2006 to the right of previously mapped block 2005 beginning at the same Y coordinate. This mapping, however, exceeds the horizontal physical page boundary. Block 2006 must then be mapped to a new page.

Page 2010 is the next physical page. Block 2006 maps to the upper left of page 2010. The process described above continues for block 2007. FIG. 15 shows the completed document.

A preferred embodiment of the invention has now been described. Variations and modifications will be apparent to those of skill in the art. For example, processes described herein operate on the image black pixels. Processes may be carried out on the white pixels to derive the relationships described herein by negative implication. In addition, the physical page may comprise not only a sheet of paper, but also include a display monitor or other humanly visible representation of the document image. For this reason, the invention should be defined in light of the appended claims.

What is claimed is:

1. A method for expanding whitespace in a document image having dimensions X, Y, comprising the steps of:

obtaining a digital representation of said document image;

identifying a set of rectangles that bound image data within the digital representation of said document image, said data including text and non text data, each of said rectangles having an original size; and mapping said set of rectangles to an area $C_1X$ by $C_2Y$, wherein $C_1$ and $C_2$ are not both equal to one; and preserving said original size of each of said rectangles;

wherein an output document image having changed whitespace between said image data in said X and Y directions, and unaltered image data size is created, said output document image distorted from said original document image by said value $C_1$ along said X direction and by said value $C_2$ along said Y direction.

2. A method for varying whitespace of an input document image comprising the steps of:

obtaining a digital representation of said input document image;

identifying a set of rectangles that bound image data within the input document image, said data including text and non text data, each of said rectangles having an original size;

assigning a first set of coordinates $(x_0, y_0)$ and $(x_n, Y_m)$ to each one of said rectangles; and assigning each one of said rectangles to a second set of coordinates $(x_{0_2}, Y_{0_2})$ and $(x_{n_2}, Y_{m_2})$ wherein said second set of coordinates equals:

$$x_{0_2} = C_1 x_0;$$

$$y_{0_2} = C_2 Y_0;$$

$$x_{n_2} = C_1 x_0 + (x_n - x_0) \text{ and};$$

$$y_{m_2} = C_2 Y_0 + (y_m - y_0),$$

wherein $C_1$ and $C_2$ are not both equal to one; and wherein a second document image is created having a change in whitespace between each of said rectangles in said X and Y directions and wherein each of said rectangles maintains said original size and said second document image is distorted from said input document image by said value $C_1$ along an X direction and by said value $C_2$ along a Y direction.

3. The method for varying whitespace of claim 2 further comprising the steps of:

verifying that said second document image fits within a physical page having dimensions X, Y; and dividing said second document image into an initial and a subsequent image area if said second document image has dimensions that exceed said physical page;

wherein each of said initial and said subsequent image areas fit within said physical page.

4. The method for varying whitespace of claim 3 further comprising the steps of:

assigning a numerical sequence to each of said image areas;

renumbering said numerical sequence to include said initial and said subsequent image areas to obtain a second numerical sequence; and mapping, in said second numerical sequence, said image areas to said physical page.

5. The method of claim 4, wherein the document image contains n image areas and wherein said n image areas comprise picture image areas and text image areas and wherein said step of mapping said image areas further comprises the steps of:

(a) mapping said picture image areas to said physical page;

(b) mapping, a first text image area to an upper left of said physical page;

(c) mapping, an $A_i$ text image area beneath an $A_{i-1}$ text image area when said $A_i$ text image area fits in said physical page;

(d) mapping said $A_i$ text image area to a portion of said physical page adjacent a right hand edge of said $A_{i-1}$ text image area when said $A_i$ text image area fits in said physical page and when step (c) exceeds a boundary of said physical page; and (e) beginning a new physical page when step (d) exceeds said boundary of said physical page.

6. The method of claim 2 wherein $C_1$ is greater than $C_2$.

7. The method of claim 2 wherein $C_2$ is greater than $C_1$.

8. In a character recognition system, a method for varying spacing in a document image and for preserving logical reading order, the method comprising the steps of:

providing a representation of a document image to a run length extraction and classification means, said representation comprised of a plurality of scan lines;

extracting run lengths from each individual scanline of said representation of said document image;

classifying each of said run lengths as one of short, medium or long based on a length of said run length, wherein a plurality of run length records are created;

constructing rectangles from said run length information, each of said rectangles representing a portion of said document image, each of said rectangles having a set of coordinates $(x_0, y_0, x_n, y_n)$, and each of said rectangles separated by a space; and assigning each one of said rectangles to a second set of coordinates $(x_{0_2}, Y_{0_2})$ and $(x_n, Y_{m_2})$ wherein said second set of coordinates equals:

$$x_{0_2} = C_1 x_0;$$

$$y_{0_2} = C_2 y_0;$$

$$x_{n_2} = C_1 x_0 + (x_n - x_0) \text{ and};$$

$$y_{m_2} = C_2 y_0 + (y_m - y_0),$$

wherein $C_1$ and $C_2$ are not both equal to one; and wherein a second document image having spacing different in size than said first document image is created, said second document image distorted from said original document image by said different spacing.

9. The method of claim 8 further comprising the steps of:

classifying each of said rectangles as type image, vertical line, horizontal line or unknown;

creating a plurality of text blocks from said rectangles classified as unknown;

assigning a numerical order to each of said text blocks;

verifying that said second set of coordinates fits within a physical page having dimensions X, Y;

dividing a given image area having said second set of coordinates that exceed said physical page into an initial and a subsequent image area; and wherein each of said initial and said subsequent image areas fit within said physical page.

10. The method for varying whitespace of claim 9 further comprising the steps of:

renumbering said numerical order to include said initial and said subsequent image areas to obtain a second numerical order; and mapping, in said second numerical order, said image areas to said physical page.

11. The method of claim 10, wherein the document image contains n image areas and wherein said n image areas comprise picture image areas and text image areas and wherein said step of mapping said image areas further comprises the steps of:

(a) mapping said picture image areas to said physical page;

(b) mapping, a first text image area to an upper left of said physical page;

(c) mapping, an $A_i$ text image area beneath an $A_{i-1}$ text image area when said $A_i$ text image area fits in said physical page;

(d) mapping said $A_i$ text image area to a portion of said physical page adjacent a right hand edge of said $A_{i-1}$ text image area when said $A_i$ text image area fits in said physical page and when step (c) exceeds a boundary of said physical page; and (e) beginning a new physical page when step (d) exceeds said boundary of said physical page.

12. An apparatus for varying spacing in a document image comprising:

means for scanning said document image from a first page having a size, said document image having image data including text having a typesize, said text surrounded by space having an area;

means for identifying a set of rectangles that bound said image data within the document image;

means for mapping said set of rectangles to an area $C_1X$ by $C_2Y$ to form a second document image distorted along said X direction by a factor of $C_1$ and along said Y direction by a factor of $C_2$;

wherein $C_1$ and $C_2$ are not both equal to one; and means for printing said second document image onto a second page having a size, wherein said first page size is equal to said second page size;

wherein said second document image includes image data including text having said typesize and spacing having an expanded area.

13. An apparatus for varying spacing of an input document image including text, graphics, and noise images, said text having a type size, comprising:

means for scanning said input document image;

means for identifying a set of rectangles that bound image data within said input document image, each of said rectangles having an input size and separated by a spacing;

means for assigning a first set of coordinates $(x_0, y_0)$ and $(x_n, y_m)$ to each one of said rectangles; and means for assigning each one of said rectangles to a second set of coordinates $(x_{0_2}, y_{0_2})$ and $(x_{n_2}, y_{m_2})$ wherein said second set of coordinates equals:

$x_{0_2} = C_1 x_0$;

$y_{0_2} = C_2 y_0$;

$x_{n_2} = C_1 x_0 + (x_n - x_0)$ and;

$y_{m_2} = C_2 y_0 + (y_m - y_0)$;

wherein a second document image is created, said second document image distorted from said input document image by a factor $C_1$ in said X direction and by a factor $C_2$ in said Y direction wherein $C_1$ and $C_2$ are not both equal to one;

wherein said second document image has a change in the spacing between said text, graphics and noise images in said X and Y directions.

14. A photocopier comprising:

input means for obtaining a first digital representation of an input hard copy document;

user input means for designating a magnification scale;

a first portion of memory for storing said first digital representation;

a processor, coupled to said input means, said first portion of memory, and said user input means, said processor for:

(a) identifying text and graphics images in said first digital representation and bounding said images with a set of rectangles, each of said rectangles separated by spacing in an X and a Y direction, each of said rectangles having a size;

(b) assigning a first set of coordinates to each of said rectangles;

(c) assigning a second set of coordinates to each of said rectangles according to said magnification scale wherein said rectangles remain unchanged in size and said spacing between said rectangles changes in size in said X and Y directions;

(d) producing a second digital representation of said document; and (e) storing said second digital representation of said document in a second portion of said memory;

an output device, coupled to said processor and to said memory, for outputting said second digital representation of said document on paper wherein a second hard copy document, distorted from said input hard copy document by said changed spacing, is produced.

15. A document processing apparatus for altering the spacing of an input document, the apparatus comprising:

a user input device having a selectable document whitespace magnification scale;

a memory having a first portion and a second portion;

an input device, coupled to said memory, wherein said document is transformed by said input device into a first digital representation and stored in said first portion of memory;

a processor, coupled to said input device, said memory, and said user input device, said processor for:

(a) identifying text and graphics images in said first digital representation and bounding said text and graphics images with a set of rectangles, each of said rectangles having a size and each separated from one another by spacing in X and Y directions;

(b) assigning a first set of coordinates to each of said rectangles;

(c) assigning a second set of coordinates to each of said rectangles according to said magnification scale wherein said rectangles remain unchanged in size and said spacing between said rectangles is changed in size by an amount equal to said magnification scale;

(d) producing a second digital representation of said document; and (e) storing said second digital representation of said document in a second portion of said memory;

an output device, connected to said processor and said memory, wherein said second digital representation is output on paper to produce an output document distorted from said input document by a factor of said magnification scale to have a change in whitespace along said X and Y directions.

16. The apparatus of claim 15 wherein said apparatus comprises an area network.

17. The apparatus of claim 15 wherein said apparatus comprises a personal computer.

* * * * *